United States Patent [19]

Kubena, Jr. et al.

[11] Patent Number: 5,211,250
[45] Date of Patent: May 18, 1993

[54] METHOD FOR STABILIZING BOREHOLES

[75] Inventors: Edwin Kubena, Jr., Richmond, Tex.; Lee E. Whitebay, Ponca City, Okla.; James A. Wingrave, Chadds Ford, Pa.

[73] Assignee: Conoco Inc., Ponca City, Okla.

[21] Appl. No.: 823,505

[22] Filed: Jan. 21, 1992

[51] Int. Cl.$^5$ .................. E21B 21/00; E21B 33/138
[52] U.S. Cl. .................................. 175/72; 166/294; 507/124; 507/140
[58] Field of Search ............... 166/294, 295; 175/65, 175/72; 507/140, 124

[56] References Cited

U.S. PATENT DOCUMENTS

| | | | |
|---|---|---|---|
| 2,573,690 | 11/1951 | Cardwell et al. | 166/295 |
| 2,650,195 | 8/1953 | Cardwell et al. | 166/295 X |
| 3,053,764 | 9/1962 | Hummel | 507/140 |
| 3,989,630 | 11/1976 | Walker | 175/65 X |
| 4,957,174 | 9/1990 | Whitfill et al. | 175/72 |
| 4,988,450 | 1/1991 | Wingrave et al. | 175/65 X |
| 5,072,791 | 12/1991 | Whitebay | 166/294 X |
| 5,076,944 | 12/1991 | Cowan et al. | 175/72 X |
| 5,114,597 | 5/1992 | Rayborn et al. | 166/294 X |

OTHER PUBLICATIONS

EPC Application No. 89302558.5, Wingrave et al., Sep. 1989.

Primary Examiner—George A. Suchfield

[57] ABSTRACT

A method of stabilizing a wellbore being drilled through both shale and sandstone zones. A shale stabilizing agent and finely divided particulate material are combined in a water based drilling fluid to provide the stabilization.

3 Claims, No Drawings

METHOD FOR STABILIZING BOREHOLES

BACKGROUND OF THE INVENTION

1. Field of the Invention

This invention relates to drilling of wells, and more particularly to stabilization of boreholes drilled through subterranean formations including at least one unconsolidated sandstone zone and at least one shale zone, such as in drilling for oil and/or natural gas.

A problem often encountered in drilling through a shale zone is that the drilling fluid causes the shale to swell and slough off, resulting in a non-uniform borehole.

A problem often encountered in drilling through unconsolidated sandstone zones, and especially potential pay zones, is that of degradation of the borehole wall in the completion zone.

2. The Prior Art

A shale-stabilizing drilling fluid additive comprised of certain high molecular weight polymers and potassium salts is described in European Patent application No. 89302558.5. This additive when used in water-based drilling fluid effectively stabilizes the shale so that the borehole does not lose physical and dimensional integrity when exposed to water based drilling fluids.

U.S. Pat. No. 4,957,174 describes a process of correcting lost circulation of drilling fluid by adding particulate coke particles to a drilling fluid. This is a remedial process not related to formation stability.

In pending and commonly assigned U.S. application Ser. No. 07/785,647, now U.S. Pat. No. 5,018,020, a process is described in which formation fracture and propagation during drilling are prevented or inhibited by addition of finely divided (250–600 microns) particulate material to the drilling fluid.

SUMMARY OF THE INVENTION

This invention is directed to a method of stabilizing wellbores which penetrate both shale and unconsolidated sandstone zones. It is accomplished by adding to a water based drilling fluid an effective amount of a shale stabilizing agent and finely divided particulate material. The two additives provide more than just the cumulative benefits of individual additives, as will be described below.

DESCRIPTION OF THE PREFERRED EMBODIMENTS

The shale-stabilizing additive used in the process of the invention consists essentially of one or more water-soluble polymers combined with one or more alkaline potassium salts in wide-ranging ratios effective to give a composition having a pH of at least 9. The water-soluble polymer or polymers of this invention are of relatively high molecular weight and are capable of forming nucleophilic sites when treated with a base. The potassium salt or salts are those whose anions are relatively strong Bronsted-Lowry bases; i.e., give a pH of 9 or above in the presence of an aqueous solution of the polymer, but are relatively weak nucleophiles compared to the nucleophilic sites on the polymer.

The weight ratio of polymer/potassium salt should generally be in the range between about 1:20 and about 3:1. A generally preferred ratio is one in the range between about 1:2 and about 2:1. The polymer/potassium salt composition should be used in a concentration sufficient to effect stabilization of shale and clay formations.

The upper limit on the polymer/salt content of the fluid is one of practicality. Usually the polymer/salt composition is added to the fluid at a level between about 0.01 weight percent and 10.0 weight percent (based on the weight of the aqueous phase), typically between about 0.1 and about 4.0 weight percent, and preferably between about 0.3 and about 2.0 weight percent.

The polymers useful for the purposes of this invention must be:

a. water-soluble,
b. capable of forming several nucleophilic sites within the same molecule when treated with bases, and
c. of relatively high molecular weight.

Water-solubility of the polymers of this invention affords compatibility with formation water. The polymers of this invention must not only be water-soluble but they should also have good wetting properties and a reasonable rate of dissolution in water for convenient use in the field. They should also afford aqueous solutions of low to moderate viscosities.

The polymers useful in this invention must be polyfunctional and be capable of forming relatively strong nucleophilic sites when treated with bases, particularly in comparison with the potassium salts used in the fluids.

The polymers useful in this invention must have a relatively high molecular weight. While the exact molecular weights will vary from polymer to polymer, it is a parameter than can be determined empirically. Partially hydrolyzed polymeric vinylacetate (PHPVA) having a number average molecular weight ($M_n$) of about 46,000 or below, represented by ELVANOL 90–50 or ELVANOL 71–30, while giving some stabilizing effect, is substantially less effective than those of higher molecular weight. Partially hydrolyzed vinyl acetate homopolymers, $M_n$ of about 75,000, represented by ELVANOL HV and ELVANOL 5042, used as is or crosslinked with glutaraldehyde to increase the $M_n$ to about 190,000, are more effective. The ELVANOL products referred to herein are available from E. I. du Pont de Nemours and Company.

The polymers of choice for purposes of the invention are partially hydrolyzed polymeric vinyl acetate (PHPVA) homo- and copolymers. In general, the homopolymers should be at least 75 mol percent hydrolyzed to the corresponding polyvinyl alcohols and have an $M_n$ of 50,000 or more. In practice, the vinyl acetate homopolymer can be hydrolyzed to about 98 to 99 percent. However, as that upper practical limit is approached, the polymer becomes more crystalline and, as a consequence, less soluble in water, requiring heat to dissolve it. PHPVA which is about 87 or higher mol percent hydrolyzed is the most soluble in water. The only constraint on molecular weight is water-solubility. In a preferred embodiment, a vinyl acetate homopolymer having an $M_n$ of 85,000 and which has been hydrolyzed about 87 percent is used.

In another preferred embodiment, a vinyl acetate copolymer is used. In the latter embodiment, the vinyl acetate portion of the copolymer can be hydrolyzed as fully as possible (about 98 to 99 percent) without loss of water-solubility. The presence of copolymer units derived from monomers other than vinyl acetate inhibits crystallization and thereby promotes water-solubility. Representative comonomers include acrylic and methacrylic acid, amides such as acrylamide and methacrylamide, and alkyl methacrylonitrile and acrylonitrile.

The amount of the comonomer used with vinyl acetate will vary with the identity of the comonomer. However, that amount can be determined empirically by using enough to provide the degree of water-solubility desired in the copolymer. For example, vinyl acetate copolymers can be prepared from the preferred comonomer, acrylic acid, using monomer mixtures containing 14 to 39 mol percent (preferably 20 to 35 mol percent) acrylic acid.

Other polymers suitable for the purposes of this invention include partially (about 30 percent) hydrolyzed polyacrylamide which also contains potassium chloride, carboxymethyl hydroxyethyl celluloses with $M_n$ of between about 350,000 and 500,000; hydroxyethyl cellulose having an $M_n$ of about 200,000; hydroxypropyl methyl celluloses having an $M_n$ of from about 300,000 to 1,000,000; and hydroxyl-propyl guar having an $M_n$ of about 600,000.

One or more potassium salts are used with the polymers in the process of this invention. The anions of the potassium salts must be relatively strong Bronsted-Lowry bases, but they should be relatively weak nucleophiles in comparison with the nucleophilic sites on the polymers. The potassium salts should be sufficiently alkaline so as to raise the pH to about 9.0 and to buffer it, at least temporarily, at a pH of at least 9.0; a pH range of 10.5 to 11.5 is preferred for PHPVA, and a range of 9.0 to 10.0 is preferred when polyacrylamide is the polymer. It is technically feasible to operate at pH values between 11.5 and 13.0 when using PHPVA; however, such high pH values are somewhat less acceptable with respect to exposure of personnel in the field. A number of inorganic salts are suitable for use in conjunction with the polymers. Potassium silicate, potassium carbonate, and tribasic potassium phosphate may be used. The anions of these salts are all fairly strong Bronsted-Lowry bases and fairly weak nucleophiles.

Potassium silicates can be obtained commercially in a variety of $SiO_2$ to $K_2O$ ratios. Those having a $SiO_2/K_2O$ ratio in the range of about 0.5 to 2.5 are suitable for use in the present invention. However, the range of about 1.5 and 2.2 is preferred. When potassium silicates in the preferred range are included, the resultant fluids are very effective. Moreover, these types of potassium silicates are not expensive and do not tend to absorb moisture during storage or handling.

Water-soluble, partially hydrolyzed polyvinyl acetate (PHPVA) combined with potassium silicate, with or without another alkaline potassium salt, is used in a preferred embodiment of the present invention. In general, a composition within that embodiment will contain by weight about 20 to 100 parts of PHPVA, about 25 to 90 parts of potassium silicate, and 0 to about 90 parts of another alkaline potassium salt, such as potassium carbonate. A more preferred composition will contain about 40 to 70 parts PHPVA, 20 to 50 parts of potassium silicate, and about 10 to 40 parts of potassium carbonate. A most preferred composition is 70 parts PHPVA, 20 parts potassium silicate, and 10 parts potassium carbonate.

The ingredients that make up the shale-stabilizing composition useful in this invention may be introduced into the drilling fluid in a variety of ways. For example, they may be combined by simple blending to form an additive mixture, commonly referred to as a premix, for later incorporation into the drilling fluid.

The particulate material used to stabilize the sandstone formations is preferably calcined delayed petroleum coke, but other inert particulate materials may be used, provided they are non-reactive with other components of the composition at operating conditions, and that they have suitable strength and appropriate density such that they neither tend to float nor sink excessively in the composition. Many materials, including crushed nut hulls, beads of glass, plastic, ceramic, metal, etc., offer appropriate properties.

The material typically has a size range of from 75 to 1,400 microns, and is present in an amount of from 30 to 50 pounds of particulate material per barrel of drilling fluid. In instances where a finer grain sandstone formation is expected, from 5 to 20 pounds of particulates having a size range of from 25 to 75 microns is also utilized in addition to the larger size particles.

As to the shale zone, the stabilization of the shale is provided by the shale-stabilizing agent, and the particulates are not a factor.

As to the sandstone zone, the combination of the particulates and the polymeric shale-stabilizing agent provides stabilization of the sandstone beyond what would be provided by the particulates alone. In the sandstone stabilization, the particulates will bridge the sandstone pores, and the polymeric material in the shale-stabilizing agent will bind the particles in place. Additionally, the shale-stabilizing agent will stabilize any clay or silt present in the sandstone, thus providing enhanced stabilization of the sandstone.

We claim:

1. In a method of drilling a well through subterranean formations including at least one shale zone and at least one sandstone zone, the improvement comprising utilizing a water-based drilling fluid containing a stabilizing composition comprised of (1) one or more water-soluble high molecular weight polyfunctional polymers capable of forming several nucleophilic sites when treated with base and (2) one or more potassium salts whose anions are Bronsted-Lowry bases of sufficient strength to raise the pH of the stabilizing fluid to about 9.0 but which are relatively weak nucleophiles compared to the nucleophilic sites of the polymers, said polymers and said salts being present in an amount effective to stabilize said shale zone, said drilling fluid also containing particulate material having a size range of from 75 to 1,400 microns in a amount of from 30 to 50 pounds of particulate material per barrel of drilling fluid whereby said particulate material in combination with said stabilizing composition stabilize said sandstone zone.

2. The method of claim 1 wherein said particulate material is petroleum coke.

3. The method of claim 2 wherein said drilling fluid also contains, per barrel of drilling fluid, from 5 to 20 pounds of particulate coke having a size range of from 25 to 75 microns.

* * * * *